March 25, 1930.  E. BUCK  1,751,853
BATTER FORK
Filed June 17, 1929
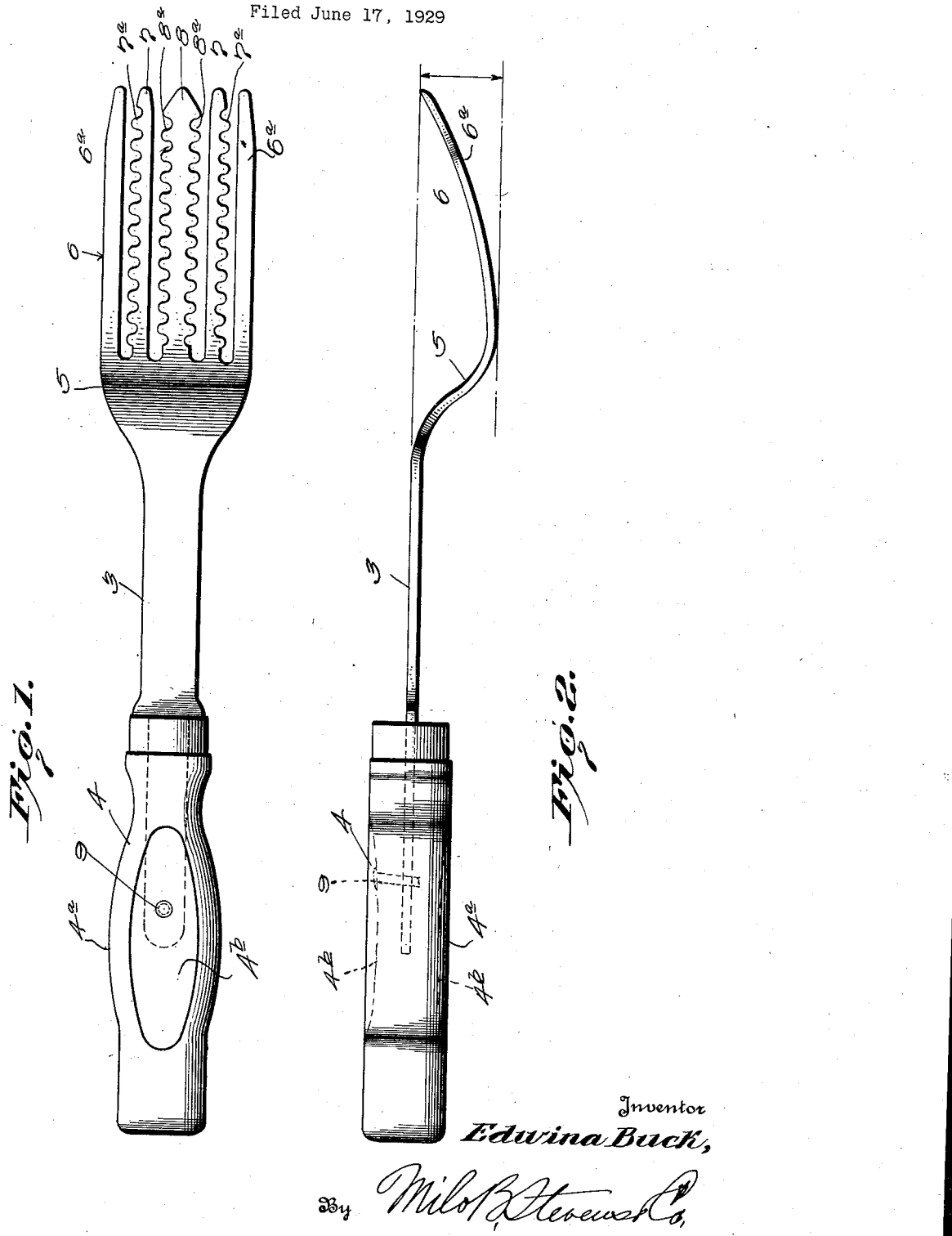
Inventor
Edwina Buck,
By Milo B. Stevens Co,
Attorney Patented Mar. 25, 1930

1,751,853

UNITED STATES PATENT OFFICE

EDWINA BUCK, OF GLENDALE, CALIFORNIA

BATTER FORK

Application filed June 17, 1929. Serial No. 371,571.

My invention relates to improvements in batter forks and has for its primary object the provision of a novel and improved device of this kind which is very efficient in the mixing of batter, beating up eggs, and for other purposes,—the nature of the construction of the device being such that the work will be accomplished very rapidly.

The invention also has for an object to provide a device, as characterized, which may be used with equal efficiency by either a right or left handed person.

Another object of the invention is to furnish a batter or beating fork, the tines of which provide cutting and sifting edges which greatly expedite the mixing in of solid matter, such as flour.

The invention also contemplates a device of this kind having a tined head arranged at such an angle with respect to the handle or shank as to place the head in substantial coincidence with the bottom of the bowl while the beating operation is taking place,— thus to secure the maximum of efficiency and permit the operator to manipulate the hand in comfortable fashion.

The invention also resides in certain novel features of construction, combination and arrangement of the various parts, all of which will be readily understood and appreciated by those skilled in the art upon reference to the accompanying drawing in connection with the detailed description which follows.

It is to be understood that the preferred embodiment of the invention is disclosed herein, but is susceptible of considerable change and modification within the spirit and scope of the subject matter claimed hereinafter.

In the drawing,

Figure 1 is a plan view of a batter fork incorporating my invention, and

Figure 2 is a side elevational view thereof.

Referring specifically to the drawings, wherein the same reference characters designate the same parts in both views, numeral 3 denotes the shank of the fork which is secured in the handle 4, which is shaped to provide a lateral bulge $4^a$, which provides a finger grip. The nature of the handle is such that a comfortable hold may be taken of the same.

The forward end of the shank 3 is offset, as indicated at 5, and terminates in a tined head 6 having side tines $6^a$, a central tine 8, and an additional tine 7 at either side of the central tine 8.

It will be noted that the intermediate tine 8 is provided with laterally projecting tongues or portions $8^a$ arranged in spaced longitudinal series, while tines 7 have their outer edges only formed with similar tongues $7^a$ also arranged in spaced longitudinal series. The tongues $7^a$, $8^a$ provide or constitute the sifting edges of the tines referred to, serving to sift, so as to speak, the flour or solid matter in the operation of the fork in beating up batter or the like. The inner edges of the tines 7 are perfectly straight and provide cutting edges, as do also the inner and outer edges of the side tines $6^a$.

Since the serrations $7^a$ of the tines 7 extend in opposite directions it will be manifest that the fork may be used with equal facility by a right or left handed person. This permits the cook to change hands when one becomes tired.

The deep curve $5^a$ of the shank places the tined head 6 in a plane which is substantially at an angle of 40° to the shank 3, making it possible to dispose the head 6 substantially coincident with the bottom of the bowl when beating.

The handle 4 preferably has side depressions $4^b$ to provide a better finger grip. As shown the handle is held in place by means of a rivet 7 extending partially through the handle and the end of the shank 3.

Having thus described my invention, what I claim as new and desire to secure by Letters Patent is:

1. A batter fork comprising a handled shank having a tined head lying in a plane at an angle to the major portion of said shank, said head having a plurality of spaced flat tines lying in the same plane and extending in a longitudinal direction and two remote tines having a serrated outer edge at one side and a straight inner edge at the other.

2. A batter fork comprising a handled shank having a tined head lying in a plane at an angle to the major portion of said shank, said head having a plurality of spaced flat tines lying in the same plane and extending in a longitudinal direction and two remote tines having a serrated outer edge and a straight inner edge, and a tine between said aforementioned tines and having each edge serrated, the straight edges of said first mentioned tine being disposed adjacent the intermediate tine.

3. A batter fork comprising a handled shank having a tined head lying in a plane at an angle to the major portion of said shank, said head having a plurality of spaced tines extending in a longitudinal direction and two remote tines having serrated outer edges and straight inner edges, a tine between said aforementioned tines and having each edge serrated, the straight edges of said first mentioned tine being disposed adjacent the intermediate tine, and side tines disposed outwardly of said first mentioned tines, said side tines having their outer edges straight.

4. The combination set forth in claim 3, and said side tines providing straight edges opposed to the serrated edges of said first mentioned tine.

In testimony whereof I affix my signature.

EDWINA BUCK.